United States Patent [19]
Cirri

[11] 4,230,993
[45] Oct. 28, 1980

[54] PROCESS FOR INCREASING THE PULSE REPETITION FREQUENCY IN A LASER
[75] Inventor: Gianfranco Cirri, Florence, Italy
[73] Assignee: Valfivre S.p.A., Florence, Italy
[21] Appl. No.: 898,335
[22] Filed: Apr. 20, 1978
[30] Foreign Application Priority Data
Apr. 19, 1977 [IT] Italy ............... 22604 A/77
[51] Int. Cl.² .............................................. H01S 3/10
[52] U.S. Cl. ............................................. 331/94.5 M
[58] Field of Search ............ 331/94.5 C, 94.5 G, 331/94.5 D, 94.5 S, 94.5 M
[56] References Cited
U.S. PATENT DOCUMENTS
4,065,731 12/1977 Wang ............................. 331/94.5 G Primary Examiner—William L. Sikes
Attorney, Agent, or Firm—Ostrolenk, Faber, Gerb & Soffen

[57] ABSTRACT

A process and apparatus for increasing the pulse repetition frequency in a laser is disclosed. The laser includes first and second series connected discharge tubes, a supply unit for applying energy to the discharge tubes and a pulse generator for controlling the discharge of the discharge tubes. The discharge tubes are alternately discharged such that one of the tubes is charging as the other of the tubes is discharging. In this manner, the maximum pulse frequency of the laser is twice the maximum pulse repetition frequency of each of the individual discharge tubes.

6 Claims, 4 Drawing Figures

PROCESS FOR INCREASING THE PULSE REPETITION FREQUENCY IN A LASER

BACKGROUND OF THE INVENTION

This invention relates to a process for increasing the pulse repetition frequency in a laser, more particularly a $CO_2$ laser used for inscribing of ceramic substrates for hybrid modules.

As is well known, a gas type of laser system substantially comprises discharge tubes, a high voltage supply unit, a pulse generator for discharge control of the tubes and a control unit or panel. A piece to be scribed, such as ceramic substrate, is positioned on a table X-Y which is powered and operated by a numerical control according to a preselected program. The table displacement rate and repetition frequency of laser pulses are selected to provide 4-5 pulses for each millimeter of displacement of the ceramic substrate. For example, the repetition frequency will be 50 Hz when the table rate or speed is 10 mm/sec; the frequency will be 500 Hz when the table rates is 100 mm/sec; the repetition frequency will be 1000 Hz when the table rate is 200 mm/sec. However, it is well known that at such a frequency, the energy in the pulse rapidly decays and is no longer sufficient for enscribing. Using the prior art devices it is impossible to attain certain rates of enscribing speeds even if the power of the laser is increased. This results from the fact that recharging time of the gas mixture in the tube is insufficient, if the pulse frequency for the discharge control exceeds a predetermined limit.

BRIEF DESCRIPTION OF THE INVENTION

It is the object of the present invention to provide a novel tube discharge control system which makes it possible to increase the repetition frequency of laser pulses without having to increase the laser power, so as to achieve high scribing speeds and, accordingly, a higher output capability.

According to the invention, the novel control system consists of controlling in accordance with a predetermined sequence, the discharge of the individual tubes or tube units comprising the laser apparatus so that each tube or tube unit is re-energized when the charge thereof has been re-established.

According to a preferred embodiment, an apparatus for the setting of the system comprises an oscillator connected to a pulse distributor controlling, in accordance with a predetermined sequence, the tube discharge through electronic gates.

BRIEF DESCRIPTION OF THE DRAWINGS

The invention will now be shown and described with reference to the accompanying drawings, given by mere way of example and in which.

DETAILED DESCRIPTION OF THE INVENTION

Figure 1:
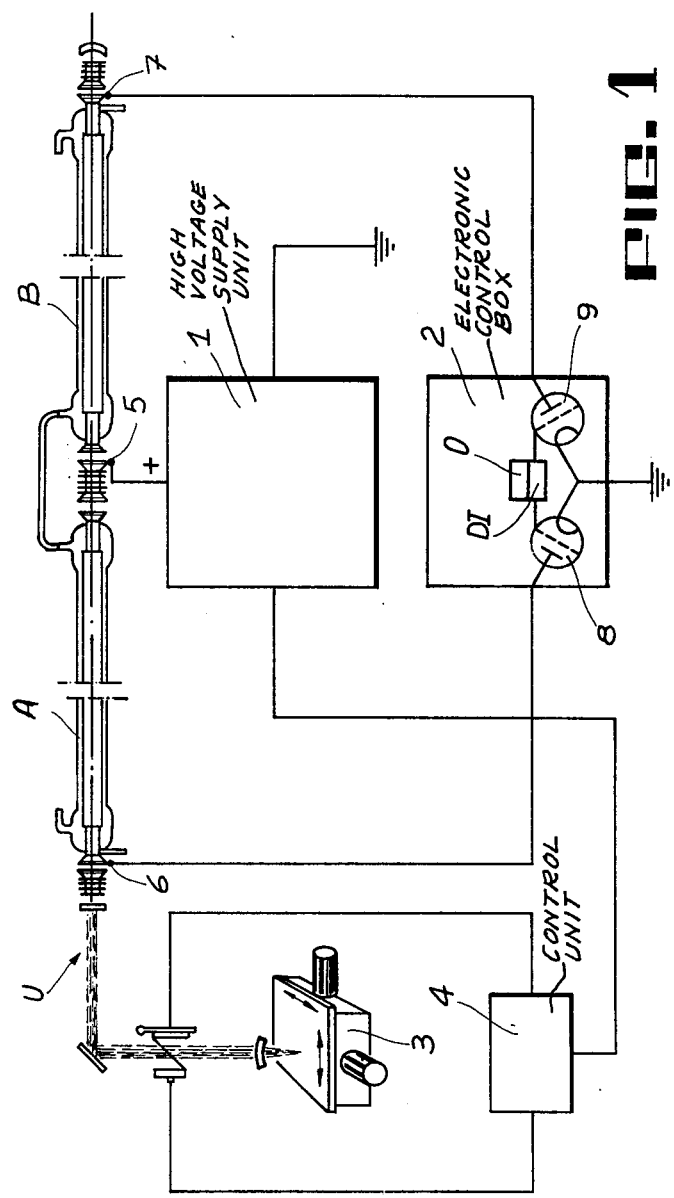
FIG. 1 shows a laser apparatus comprising two discharge tubes controlled in accordance with the invention.

Referring to FIG. 1, a laser apparatus comprising two discharge tubes A, B, a high voltage supply unit 1, an electronic control box 2 for producing control or drive pulses, a powered table 3 having placed thereon a piece to be scribed and a control unit or panel 4 is shown.

In a known manner, tubes A and B are series connected and contain a suitable gas mixture. Supply unit 1 is connected by the positive pole to the common anode 5, and table 3 is caused to move according to a predetermined program. For the sake of simplicity, the known devices and fittings forming the apparatus and providing for supplying and controlling laser mixture, water, voltage regulation, etc., have not been shown in the drawings.

According to the invention, in addition to pulse generation, the electronic control box 2 provides for alternately feeding pulses to the cathodes 6 and 7 of tubes A and B, so that one tube recharges during the time that the other tube discharges. Thus, according to the basic aspect of the invention, the alternate energization of the series connected tubes makes it possible to increase the pulse frequency at the output U of the apparatus.

Figure 2:
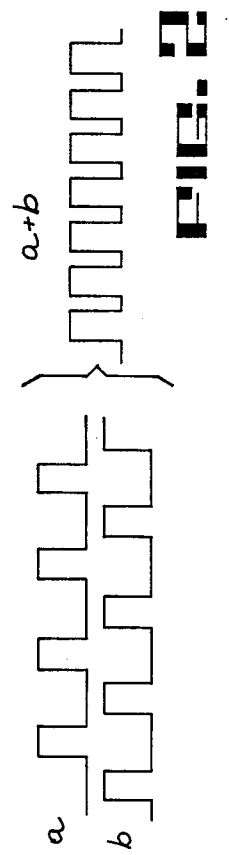
FIG. 2 shows the pattern of the pulses at the laser output.

In FIG. 2, a and b show the pattern for the pulses provided by the individual tubes A and B, a+b show the pattern for the pulses at output U, the frequency of which is twice that of the individual pulses a and b.

According to a simple embodiment of the invention, for the distribution of the control pulses said control box 2 comprises an oscillator 0 which operates as pulse generator. The oscillator 0 is connected to a pulse distributor DI, which alternatively causes the discharge of tube A or tube B, respectively, through valves 8 and 9 which are connected in the circuit of cathode 6 and cathode 7, respectively. Of course, the frequency of oscillator 0 sets the pulse repetition frequency at output U.

Figure 3:
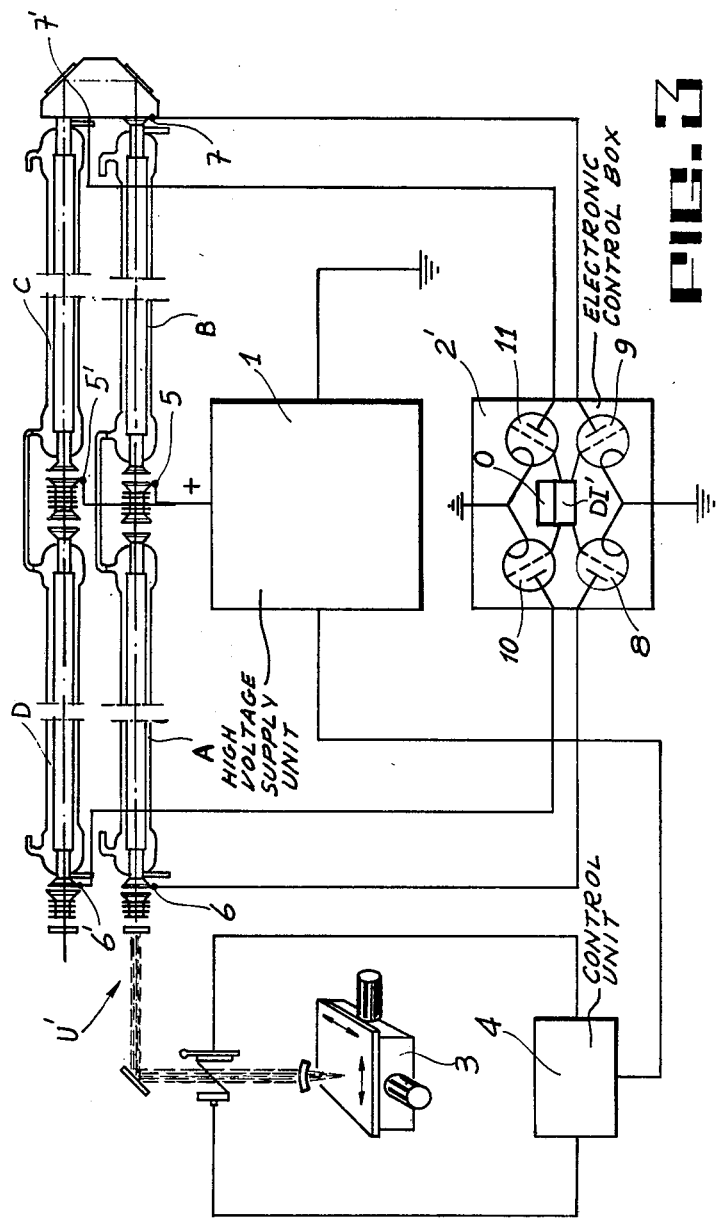
FIG. 3 shows a laser apparatus comprising four discharge tubes controlled in accordance with the invention.

In the apparatus shown in FIG. 3, there are four series connected tubes A, B, C and D, and an additional supply anode 5' supplied by unit 1. The electronic control box 2 includes a pulse distributor DI' capable of controlling four valves 8, 9, 10 and 11. Valves 8 and 9 are connected to cathodes 6 and 7 as in the apparatus of FIG. 1. Valves 10 and 11 are connected to cathode 6' of tube D and cathode 7' of tube C, respectively.

Figure 4:
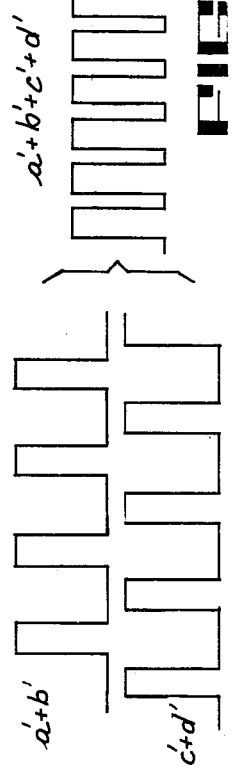
FIG. 4 shows the pattern of the pulses at the output from the apparatus of FIG. 3, should the tubes be energized in tandem.

In FIG. 4, it is assumed that distributor DI' simultaneously controls tubes A and B through valves 8 and 9, and then tubes controls D and C through valves 10 and 11. In such a case, a'+b' and c'+d' illustrate the output pulses produced by the pair of tubes AB and CD, respectively, and a'+b'+c'+d' illustrates the pulses at the apparatus output U'. It should be noted that as a result of the tube tandem connection, the amplitude of pulses a'+b', c'+d', and the amplitude of the pulses at output U' is twice that of the similar pulses of FIG. 2. The pulse distribution from DI' may occur in any predetermined sequence. Thus, for example, the pulses could be successively distributed to the four valves 8 to 11 to obtain the successive discharge of the four tubes A, B, C and D, and the tubes could as well be controlled in different combinations.

From the foregoing it is apparent that the invention enables to multiply the laser frequency. This is true for any number of the discharge tubes comprising the laser apparatus. Of course, the structure of the pulse distributor, as well as the modalities and pulse distribution law would be adapted to the particular requirements.

Finally, it is obvious that instead of valves 8, 9, 10 and 11, semiconductor devices or any other devices could be used, provided that such means are capable of operating as elecronic gates responsive to the pulses supplied by the distributor.

What is claimed is:

1. A process for increasing the pulse repetition frequency of a laser of the type including first and second series connected discharge tubes, a supply unit for supplying energy to said discharge tubes and a pulse generator for controlling the discharge of said discharge tubes, said process comprising the steps of:

alternately discharging each of said discharge tubes;
   charging one of said first and second discharge tubes while the remaining said discharge tube is discharging.

2. The process of claim 1, wherein each of said discharge tubes are discharged when its charge has been reestablished.

3. Laser apparatus, comprising:
   (A) first and second series connected discharge tubes;
   (B) a supply unit for supplying energy to said discharge tubes;
   (C) pulse generator means for controlling the discharge of said discharge tubes, said pulse generator means to discharge said tubes in such a manner that:
      (1) said first and second discharge tubes are alternately discharged; and
      (2) each of said discharge tubes is being charged while the other of said discharge tubes is being discharged.

4. The apparatus of claim 3, wherein said pulse generator means discharges each of said discharge tubes when its charge has been reestablished.

5. The apparatus of claim 4, wherein said pulse generator means comprises an oscillator connected to a pulse distributor controlling the tube discharge through electronic gates.

6. The apparatus according to claim 5, wherein said electronic gates comprise valves or semiconductor devices connected in a cathode circuit of the discharge tube.

* * * * *